United States Patent
Motoya et al.

(10) Patent No.: US 12,372,817 B2
(45) Date of Patent: Jul. 29, 2025

(54) OPTICAL WAVEGUIDE ELEMENT, AND OPTICAL MODULATION DEVICE AND OPTICAL TRANSMISSION DEVICE USING SAME

(71) Applicant: SUMITOMO OSAKA CEMENT CO., LTD., Tokyo (JP)

(72) Inventors: Masayuki Motoya, Tokyo (JP); Kosuke Okahashi, Tokyo (JP)

(73) Assignee: SUMITOMO OSAKA CEMENT CO., LTD., Tokyo (JP)

(*) Notice: Subject to any disclaimer, the term of this patent is extended or adjusted under 35 U.S.C. 154(b) by 455 days.

(21) Appl. No.: 17/915,716

(22) PCT Filed: Dec. 18, 2020

(86) PCT No.: PCT/JP2020/047464
§ 371 (c)(1),
(2) Date: Jan. 20, 2023

(87) PCT Pub. No.: WO2021/199522
PCT Pub. Date: Oct. 7, 2021

(65) Prior Publication Data
US 2023/0221590 A1    Jul. 13, 2023

(30) Foreign Application Priority Data

Mar. 31, 2020    (JP) .................... 2020-063303

(51) Int. Cl.
G02F 1/035    (2006.01)
(52) U.S. Cl.
CPC .................... G02F 1/035 (2013.01)
(58) Field of Classification Search
CPC .......................................... G02F 1/035
See application file for complete search history.

(56) References Cited

U.S. PATENT DOCUMENTS

2003/0031400 A1* 2/2003 Pruneri ................ G02F 1/2255
385/14
2013/0051725 A1* 2/2013 Shinoda ............. G02F 1/13471
385/14
(Continued)

FOREIGN PATENT DOCUMENTS

| JP | 1999295675 A | 10/1999 |
| JP | 2015061278 A | 3/2015 |

(Continued)

OTHER PUBLICATIONS

Japanese Patent Office, International Search Report, PCT/JP2020/047464, Mar. 16, 2021, Japan.

*Primary Examiner* — Uyen Chau N Le
*Assistant Examiner* — Hoang Q Tran
(74) *Attorney, Agent, or Firm* — IpHorgan Ltd.

(57) ABSTRACT

Provided is an optical waveguide device in which both signal electrode collapse and signal electrode peeling/damage can be prevented. An optical waveguide device in which an optical waveguide is formed on a substrate and a control electrode for controlling a light wave propagating through the optical waveguide is disposed on the substrate, is characterized in that, the control electrode includes a signal electrode, and the signal electrode has a narrow portion, where a width of the signal electrode on a substrate side is narrow, and a wide portion, where a width of the signal electrode on an upper portion side of the signal electrode is wide, a prevention film that is disposed in contact with the narrow portion of the signal electrode and that prevents the signal electrode from collapsing, is provided on the substrate, and at a position of the signal electrode where the narrow portion and the wide portion are connected, a surface of the prevention film is formed as a curved surface pro- (Continued)

truding toward the signal electrode, and a side surface of the signal electrode is formed along the curved surface.

6 Claims, 5 Drawing Sheets

(56) References Cited

U.S. PATENT DOCUMENTS

| | | |
|---|---|---|
| 2013/0170781 A1 | 7/2013 | Kissa |
| 2015/0084714 A1 | 3/2015 | Hirayama |
| 2015/0138619 A1 | 5/2015 | Iwatsuka |
| 2015/0331298 A1* | 11/2015 | Yagi .................... G02F 1/2257 |
| | | 385/2 |
| 2016/0291352 A1 | 10/2016 | Kissa |
| 2017/0146734 A1* | 5/2017 | Kiyota ................ G02B 6/1228 |
| 2020/0218126 A1 | 7/2020 | Iwatsuka |

FOREIGN PATENT DOCUMENTS

| | | |
|---|---|---|
| JP | 2015216318 A | 12/2015 |
| JP | 2016161661 A | 9/2016 |
| JP | 2017198908 A | 11/2017 |
| JP | 2019045880 A | 3/2019 |
| WO | 2019039215 A1 | 9/2020 |

\* cited by examiner

OPTICAL WAVEGUIDE ELEMENT, AND OPTICAL MODULATION DEVICE AND OPTICAL TRANSMISSION DEVICE USING SAME

CROSS REFERENCE TO RELATED APPLICATIONS

This application is a national stage completion application of PCT Application No. PCT/JP2020/047464, filed Dec. 18, 2020, and claims priority from Japanese Patent Application No. 2020-063303, filed Mar. 31, 2020. Each of these applications is incorporated by reference herein in its entirety.

TECHNICAL FIELD

The present invention relates to an optical waveguide device, and optical modulation device and optical transmission apparatus using the same, particularly, relates to an optical waveguide device in which an optical waveguide is formed on a substrate and a control electrode for controlling light waves propagating through the optical waveguide is disposed on the substrate.

BACKGROUND ART

In the fields of optical communication and optical measurement, optical waveguide devices are widely used such as an optical modulator in which an optical waveguide is formed on a substrate (a ferroelectric substrate or the like) having an electro-optic effect such as lithium niobate (LN). In recent years, in an optical waveguide device, an optical waveguide has been proposed in which a substrate is thinned and a rib structure is formed on a substrate by etching or the like. By using such a thin substrate, it is possible to improve the electric field efficiency or to improve the effect of interaction by velocity matching between light waves and electric signals (microwaves).

In an optical waveguide device in FIG. 1, an optical waveguide having a rib structure is provided on a portion of a ferroelectric substrate, and a buffer layer such as $SiO_2$ is formed. When a signal electrode for applying an electric field to an optical waveguide and a ground electrode are disposed on a buffer layer, as shown in FIG. 1, there is a case where the signal electrode is disposed on an upper side of the optical waveguide having a rib structure.

In order to improve the efficiency of the electric field applied to the optical waveguide by using the signal electrode in FIG. 1, a width (W-EL1) of the signal electrode, which is in contact with the buffer layer, is configured to be equal to or narrower than a width (W-Rib) of the optical waveguide having a rib structure. In recent years, the thickness of the ferroelectric substrate has been proposed to be equal to or thinner than 20 μm to 30 μm, equal to or thinner than 4 μm, or even equal to or thinner than 1 μm in accordance with the demand for broadband modulation signals in the optical modulator and miniaturization of the optical waveguide device. Along with this, the width (W-Rib) of the optical waveguide having a rib structure may be equal to or thinner than 1 μm, and accordingly the lower side width (W-EL1) of the signal electrode needs to be less than 1 μm.

On the other hand, from the viewpoint of high-frequency electrical characteristics, a lower conductor loss of the electrode, especially the signal electrode is desirable. Therefore, in order to lower the resistivity of the electrode, the width (W-EL2) of the upper side portion of the signal electrode is set to be equal to or higher than the width (W-EL1) of the lower side portion of the signal electrode. Moreover, the height of the signal electrode is set to equal to or higher than 10 μm in order to lower the resistivity, which causes a problem that the signal electrode tends to collapse.

In Patent Literature No. 1, in order to reduce a drive voltage while maintaining the characteristic impedance of a traveling-wave electrode at a predetermined value, it is disclosed that a dielectric layer having a dielectric constant lower than that of a buffer layer is disposed on both sides of a lower side portion (an optical waveguide side) of a signal electrode disposed on an optical waveguide. Moreover, it is also mentioned that the dielectric layer holds the signal electrode.

FIG. 2 shows a state in which the dielectric layer in Patent Literature No. 1 is disposed on the optical waveguide device in FIG. 1. FIG. 3 shows an enlarged view of a portion of a dotted line frame A in FIG. 2. As shown in FIG. 3, a collapse prevention film (corresponding to the dielectric layer in Patent Literature No. 1) is angularly in contact with the electrode from a narrow portion to a wide portion of the signal electrode. Therefore, when a difference in coefficient of thermal expansion between the electrode and the collapse prevention film is large, the internal stress is concentrated on an angular portion (a portion indicated by arrow B), and the electrode is lifted by a prevention film, thereby a problem occurs that the electrode is peeled off from the buffer layer.

Further, even when the signal electrode is pushed from the outside in the left and right direction in FIG. 2, the stress is concentrated on the angular portion of the collapse prevention film, thereby a problem such as the electrode being divided at the boundary between a narrow portion and a wide portion of the signal electrode also occur.

CITATION LIST

Patent Literature

[Patent Literature No. 1] Japanese Laid-open Patent Publication No. 2019-45880

SUMMARY OF INVENTION

Technical Problem

The problem to be solved by the present invention is to provide an optical waveguide device, and an optical modulation device and an optical transmission apparatus using the same, in which both signal electrode collapse and signal electrode peeling/damage can be prevented.

Solution to Problem

In order to solve the above problems, an optical waveguide device, and an optical modulation device and an optical transmission apparatus of the present invention have the following technical features.

(1) An optical waveguide device in which an optical waveguide is formed on a substrate and a control electrode for controlling a light wave propagating through the optical waveguide is disposed on the substrate, is characterized in that, the control electrode includes a signal electrode, and the signal electrode has a narrow portion, where a width of the signal electrode on a substrate side is narrow, and a wide portion, where a width of the signal electrode on an upper portion side of the signal electrode is wide, a prevention film"

that is disposed in contact with the narrow portion of the signal electrode and that prevents the signal electrode from collapsing, is provided on the substrate, and at a position of the signal electrode where the narrow portion and the wide portion are connected, a surface of the prevention film is formed as a curved surface protruding toward the signal electrode, and a side surface of the signal electrode is formed along the curved surface.

(2) In the optical waveguide device according to (1), the prevention film includes a permanent resist.

(3) In the optical waveguide device according to (1) or (2), the optical waveguide is a waveguide having a rib structure protruding from a surface of the substrate, and the signal electrode is disposed on an upper side of the optical waveguide.

(4) In the optical waveguide device according to any one of (1) to (3), a thickness of the substrate is equal to or thinner than 4 µm.

(5) In the optical waveguide device according to any one of (1) to (4), a buffer layer is disposed on an upper side of the substrate including the optical waveguide, and the signal electrode and the prevention film are disposed on an upper side of the buffer layer.

(6) An optical modulation device includes: the optical waveguide device according to any one of (1) to (5); a case that accommodates the optical waveguide device; and an optical fiber that inputs a light wave from an outside of the case to the optical waveguide or that outputs the light wave from the optical waveguide to the outside of the case.

(7) In the optical modulation device according to (6), an electronic circuit that amplifies a modulation signal, which is input to the optical waveguide device, is provided inside the case.

(8) An optical transmission apparatus includes: the optical modulation device according to (6) or (7); and an electronic circuit that outputs a modulation signal that causes the optical modulation device to perform a modulation operation.

Advantageous Effects of Invention

In the present invention, the optical waveguide device in which an optical waveguide is formed on a substrate and a control electrode for controlling a light wave propagating through the optical waveguide is disposed on the substrate, is characterized in that, the control electrode includes a signal electrode, and the signal electrode is provided with a narrow portion, where a width of the signal electrode on a substrate side is narrow, and a wide portion, where a width of the signal electrode on an upper portion side of the signal electrode is wide, a prevention film that is disposed in contact with the narrow portion of the signal electrode and that prevents the signal electrode from collapsing, is provided on the substrate, and at a position of the signal electrode where the narrow portion and the wide portion are connected, a surface of the prevention film is formed as a curved surface protruding toward the signal electrode, and a side surface of the signal electrode is formed along the curved surface, thereby the internal stress, which is generated by a difference in coefficient of thermal expansion between the electrode and the prevention layer, is dispersed along the curved surface, the effect of pushing up the signal electrode by the prevention film is weakened, the electrode thermally expands along the curved surface of the prevention film, and the problem of the signal electrode peeling is also suppressed.

Furthermore, when the signal electrode is pushed in the horizontal direction (left and right direction in FIG. 2), since the curved surface of the collapse prevention film evenly holds the entire side surface of the lower side portion of the signal electrode or entire step portion continuing to the upper side portion of the signal electrode, it also prevents the signal electrode from being damaged at a boundary between the lower side portion and the upper side portion.

DESCRIPTION OF EMBODIMENTS

Figure 1:
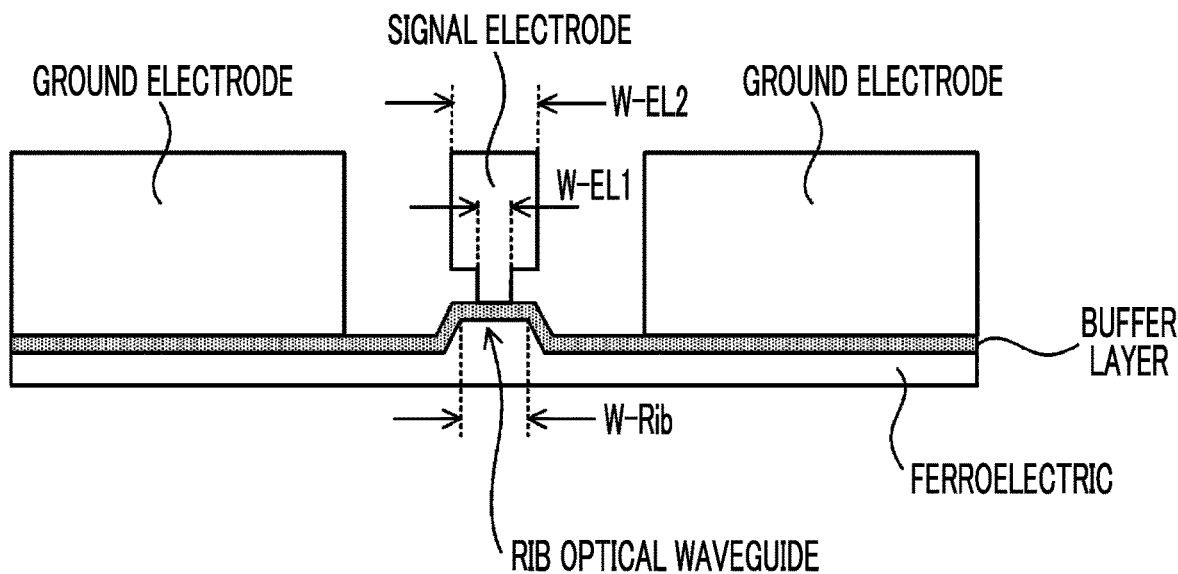
FIG. 1 is a cross-sectional view of an optical waveguide device in the related art.
Figure 2:
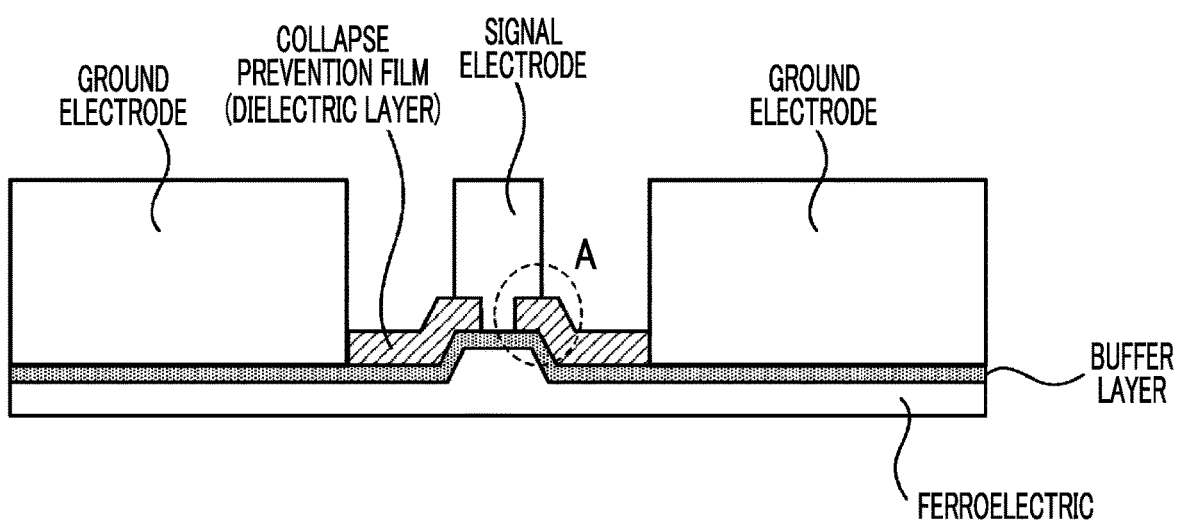
FIG. 2 is a cross-sectional view for describing a state in which the optical waveguide device in FIG. 1 is provided with a collapse prevention film of a signal electrode.

Hereinafter, an optical waveguide device, an optical modulation device, and an optical transmission apparatus of the present invention will be described in detail using preferred examples.

As shown in FIGS. 2 and 4 to 6, the optical waveguide device of the present invention in which an optical waveguide is formed on a substrate and a control electrode for controlling a light wave propagating through the optical waveguide is disposed on the substrate, is characterized in that, the control electrode includes a signal electrode, and the signal electrode is provided with a narrow portion, where a width of the signal electrode on a substrate side is narrow, and a wide portion, where a width of the signal electrode on an upper portion side of the signal electrode is wide, a prevention film that is disposed in contact with the narrow portion of the signal electrode and that prevents the signal electrode from collapsing, is provided on the substrate, and at a position of the signal electrode where the narrow portion and the wide portion are connected, a surface of the prevention film is formed as a curved surface protruding toward the signal electrode, and a side surface of the signal electrode is formed along the curved surface.

As for a substrate, a substrate having an electro-optic effect is used, and particularly, a ferroelectric such as $LiNbO_3$, $LiTiO_3$, and lead lanthanum zirconate titanate (PLZT) are preferably used. A ferroelectric substrate can be processed to a thickness of equal to or thinner than several µm by polishing. In addition, as shown in Patent Literature No. 1, it is also possible to form a lithium niobate film by epitaxial growth and form an optical waveguide by fine processing on a flat plate that serves as a base, such as a sapphire substrate. The thickness of the substrate (the ferroelectric portion) used in the present invention may be set to equal to or thinner than 4 μm, and may be set to equal to or thinner than 2 μm, further set to equal to or thinner than 1 μm in order to increase an application efficiency of an electric field.

The optical waveguide is a rib type optical waveguide in which the optical waveguide having a protruding shape is formed by etching or the like on the substrate having an electro-optic effect. It is also possible to integrally form a thermal diffused waveguide in which a high refractive index material such as Ti is thermally diffused in a rib structure portion.

The buffer layer, which is formed on the substrate including the optical waveguide, is made of a material such as $SiO_2$ having a lower refractive index than that of the optical waveguide, and is used to suppress absorption of light waves propagating through the optical waveguide by a control electrode (a signal electrode, a ground electrode, a DC bias control electrode, or the like) formed on the optical waveguide.

As a collapse prevention layer, resins such as thermoplastic resins or thermosetting resins can be suitably used, and polyamide based resins, melamine based resins, phenol based resins, amino based resins, epoxy based resins, and the like are included. Further, as for the collapse prevention layer, a permanent resist (a photoresist used in the manufacturing step of the optical waveguide device, which remains in a portion of the optical waveguide device even after the final step) can be used, and in the present invention, thermosetting resin can be preferably used.

Examples of the control electrode used in the optical waveguide device include a signal electrode and a ground electrode for applying a modulation signal, a DC bias control electrode for controlling a drift phenomenon, and the like. The control electrode is configured by forming the buffer layer on the substrate on which the optical waveguide is formed or further on top of the substrate, and then by depositing/patterning a base electrode (for example, Ti/Au) and laminating a conductive metal such as Au by using a plating method.

Figure 4:
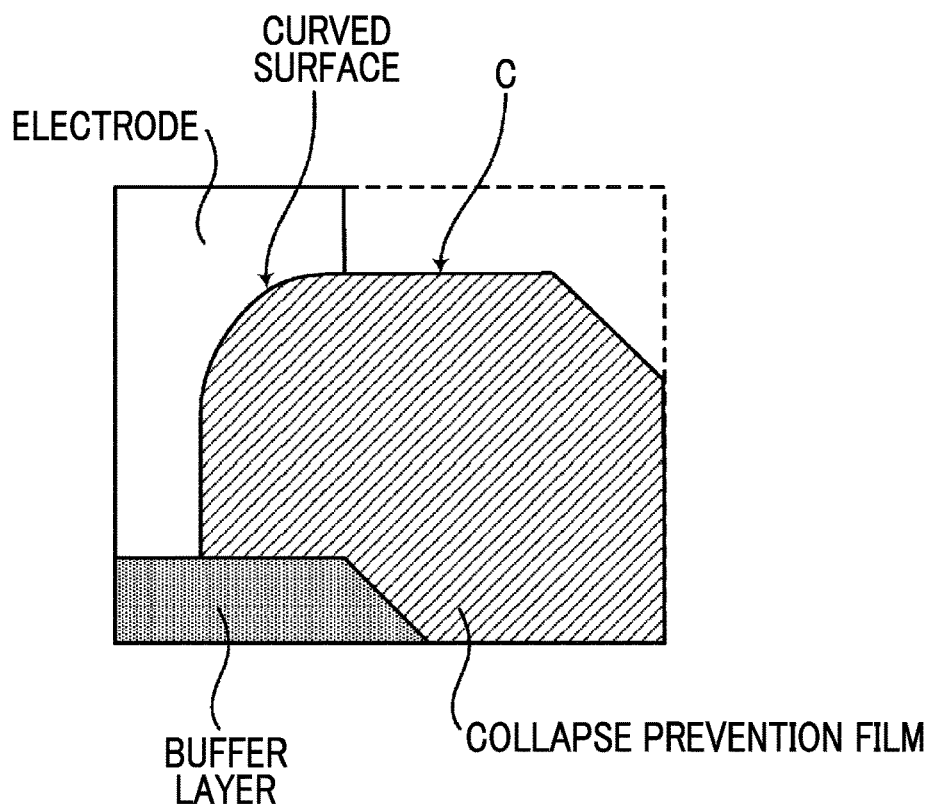
FIG. 4 is a view showing an enlarged view (Example 1 of the present invention) of the dotted line frame A in FIG. 2.

A feature of the optical waveguide device of the present invention is that, as shown in FIG. 4 (FIG. 4 is an enlarged view of a dotted line frame A in FIG. 2), the collapse prevention film is formed at a place where the width of the lower side portion of the electrode of the control electrode is narrower than the width of the upper side portion of the electrode, and further a surface of the prevention film is configured as a curved surface at a place along a side surface of the electrode of the prevention film, particularly at a portion where the width of the electrode changes. In FIG. 4, although a curved surface is formed only on a portion that is in contact with a side surface of the electrode, it is also possible to form a curved shape over a wide range from a side surface upper portion of the collapse prevention film on the electrode side to the upper surface as shown in FIG. 5.

Figure 3:
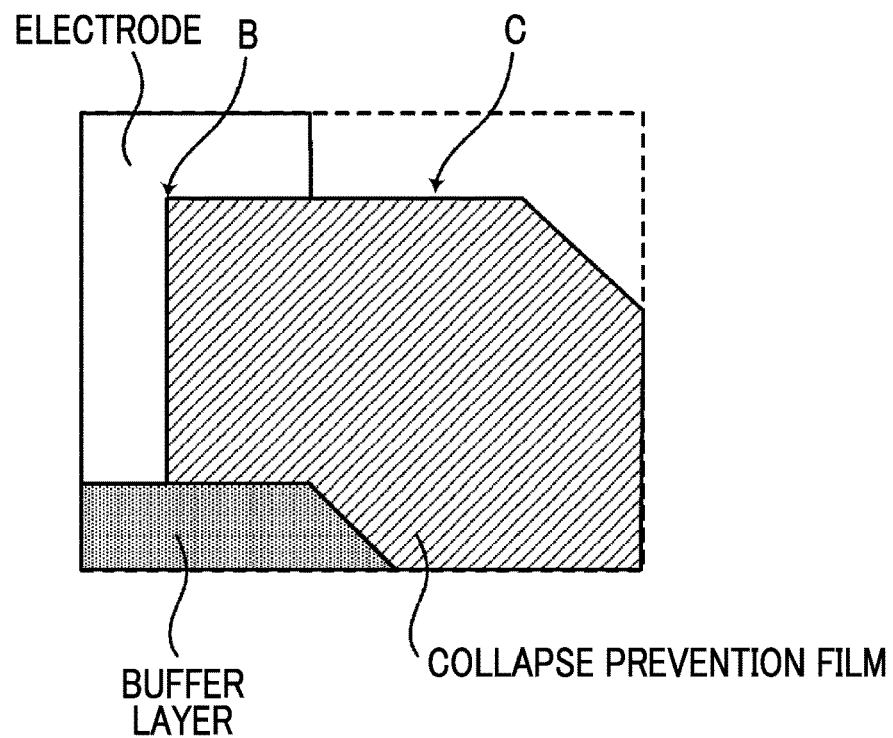
FIG. 3 is a view showing an enlarged view (an example in related art) of a dotted line frame A in FIG. 2.
Figure 5:
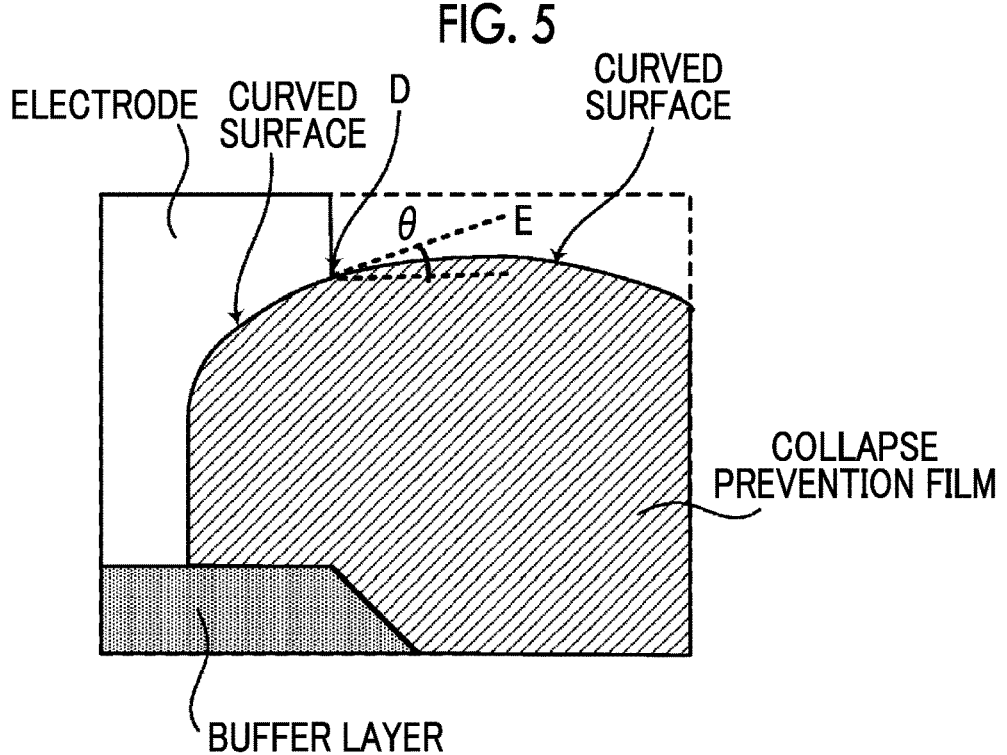
FIG. 5 is a view showing an enlarged view (Example 2 of the present invention) the dotted line frame A in FIG. 2.

As shown in FIGS. 4 and 5, since the curved surface is formed in the collapse prevention film, which is disposed along the lower side portion of the electrode to prevent the electrode from collapsing, even when there is a difference in coefficient of thermal expansion between the electrode and the prevention film, the internal stress due to the thermal expansion does not concentrate on the angular portion (a portion indicated by arrow B) in FIG. 3, and the electrode peeling is prevented. Particularly, when resin such as a permanent resist is used for the collapse prevention film, since the resin has a larger coefficient of thermal expansion than that of the electrode, the electrode peeling is more likely to occur. Therefore, the advantage of applying the configuration of the present invention is high.

In FIG. 5, a vertex of the curved surface formed on the upper surface of the collapse prevention film is disposed on an outer side of the electrode, and a side (a tangent line to the curved surface at the portion indicated by arrow D) that forms a corner of the lower portion of the electrode faces upward (the angle θ formed by the tangent line and a line parallel to the surface of the ferroelectric substrate is 0 to 90 degrees). With such a configuration, since it is not necessary to increase the curvature of the curved surface formed on the electrode, the concentration of stress can be further alleviated. Further, due to the presence of the angle θ, the collapse prevention film acts so as to push up the electrode toward the center (a diagonal upper left direction in FIG. 5) of the electrode, thereby the collapse prevention effect of the electrode can be further enhanced.

Further, even when an external force is applied to the upper side portion of the electrode, since the electrode does not have the angular portion in FIG. 3, the internal stress is dispersed, and problems such as damage of the electrode at a joining portion between the lower side portion and the upper side portion can be suppressed.

In a case of a thermosetting resin or the like, the substrate can be heated and a rounded edge portion of the resin film can be formed on the curved surface of the collapse prevention film after patterning the resin film into a predetermined shape. Further, it is also possible that a portion of the resin film is irradiated with an electron beam, laser, or the like to form a curved surface.

Figure 6:
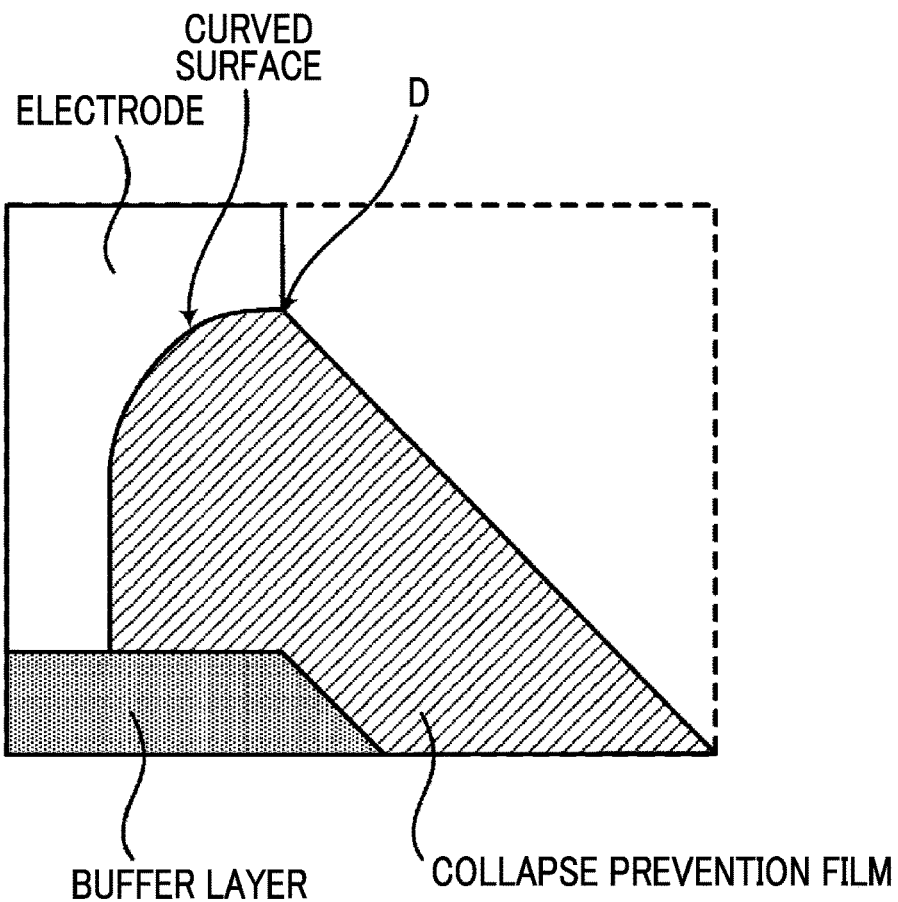
FIG. 6 is a view showing an enlarged view (Example 3 of the present invention) of the dotted line frame A in FIG. 2.

In FIG. 3 showing an example in the related art or FIG. 4 showing an example of the present invention, the upper surface of the collapse prevention film, which is indicated by arrow C, protrudes greatly on the outer side of the electrode. In contrast to this, as shown in FIG. 6, by aligning a corner portion of the electrode indicated by arrow D with a corner portion of the collapse prevention film, or by disposing the corner portion of the collapse prevention film inside the corner portion of the electrode, it is possible to reduce the volume of the collapse prevention film existing on the outer side of the electrode. As a result, it becomes possible to improve the electric field efficiency with respect to the optical waveguide as compared with those shown in FIG. 3 or FIG. 4.

Figure 7A:
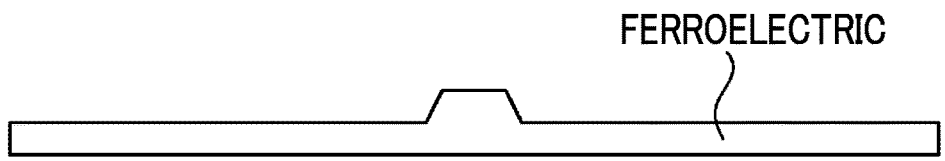
FIGS. 7A to 7F are views for describing a manufacturing step of the optical waveguide device of the present invention.

FIGS. 7A to 7F show an example of the manufacturing step of the optical waveguide device of the present invention. In FIG. 7A, a rib structure serving as an optical waveguide is formed on a portion of the ferroelectric substrate. The optical waveguide can be easily formed by performing etching on the portion other than the rib structure portion in a physically or chemically manner. Further, as described above, it is also possible to form the optical waveguide by epitaxial growth on the base substrate as in Patent Literature No. 1.

Figure 7B:
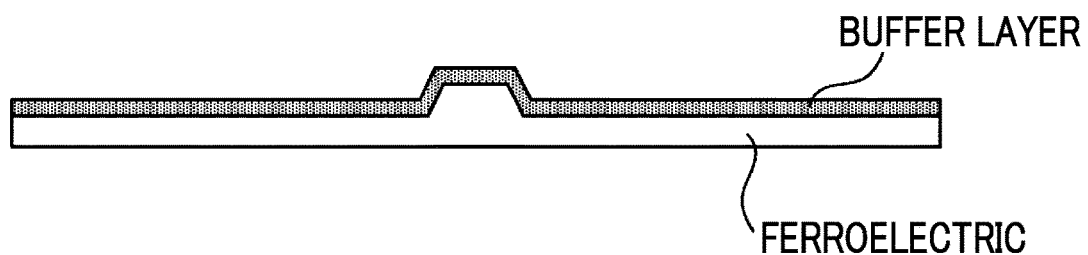

In FIG. 7B, a buffer layer is formed on an upper side of the substrate or the optical waveguide portion. In a case where a Z-cut type substrate is used, since the signal electrode is often disposed on the optical waveguide, the buffer layer is generally provided, but in a case where the signal electrode and the ground electrode are formed to interpose the optical waveguide as in an X-cut type substrate, the buffer layer is not essential.

Figure 7C:
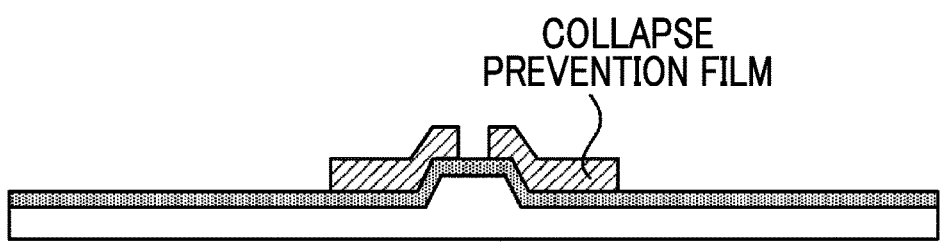

In FIG. 7C, a patterning is performed on a photoresist (a permanent resist) that serves as the collapse prevention film. Next, as shown in FIG. 7D, the entire substrate is heated, and the roundness (curved surface) is formed at the corner portion of the photoresist pattern.

Figure 7D:
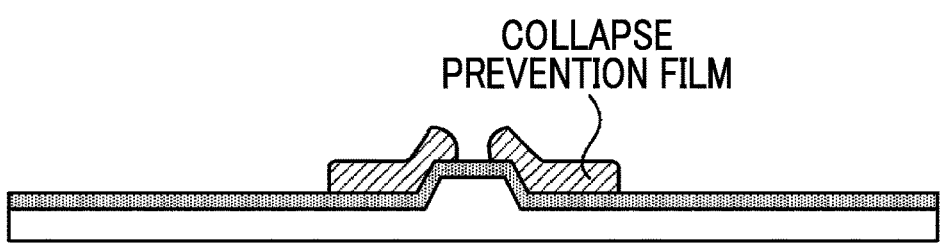
Figure 7E:
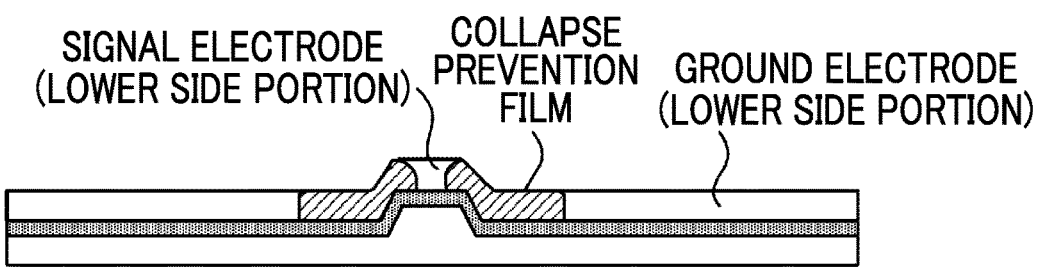
Figure 7F:
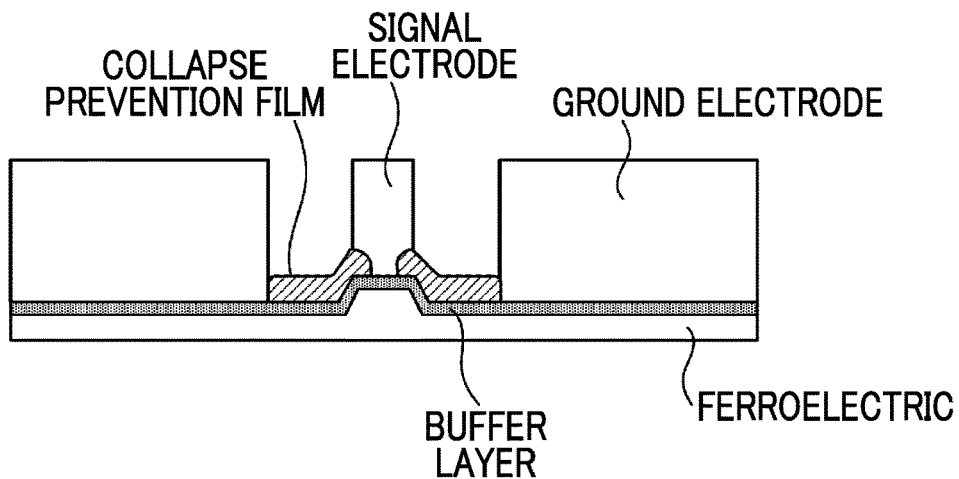

In FIG. 7E, a patterning is performed on the base electrode, and an electrode material is laminated on the base electrode by using the electrolytic plating method. Furthermore, in FIG. 7F, an electrode material is further laminated on the electrode material by using the electrolytic plating method, and the signal electrode and the ground electrode, which serve as control electrodes, are formed. When the electrode material used in FIG. 7E and the electrode material used in FIG. 7F are different, a joining layer made of metal or the like may be separately provided in order to increase the joining intensity of the electrode materials.

Figure 8:
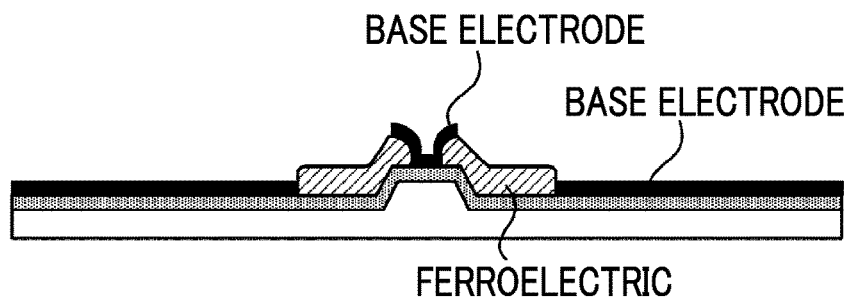
FIG. 8 is a view for describing a partial modification of the manufacturing step of the optical waveguide device shown in FIGS. 7A to 7F.

The method for manufacturing the optical waveguide device of the present invention is not limited to the method shown in FIGS. 7A to 7F, and for example, it is also possible to perform patterning on the base electrode as shown in FIG. 8, and laminate the electrode material on the base electrode by using the plating method, and then continuously form the lower side portion (the narrow portion where the width of the electrode is narrow) of the signal electrode and the upper side portion (the wide portion where the width of the electrode is wide) of the signal electrode, after the processing step in FIG. 7D.

Figure 9:
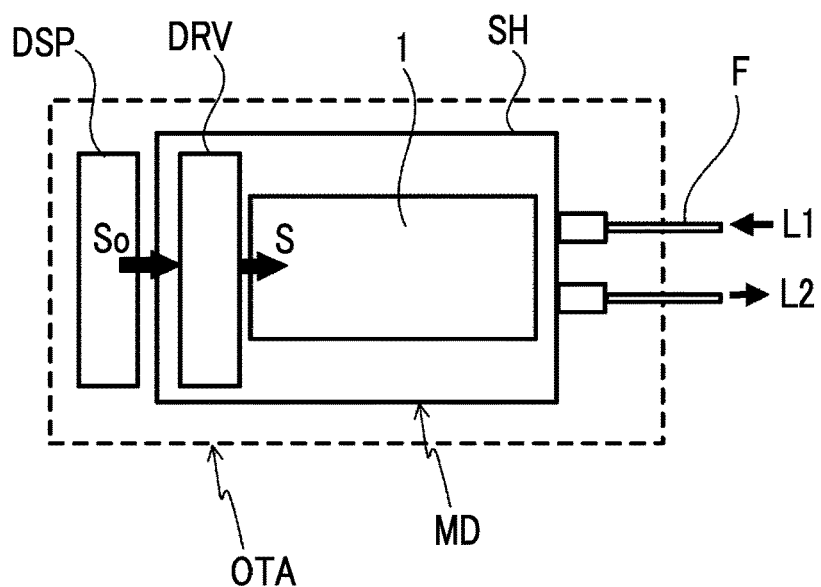
FIG. 9 is a view for describing an optical modulation device and an optical transmission apparatus according to the present invention.

Furthermore, in the present invention, it is also possible to configure an optical modulation device or an optical transmission apparatus by using the optical waveguide device described above. As shown in FIG. 9, a compact optical modulation device MD can be provided by accommodating the substrate 1 of the optical waveguide device of the present invention in a case SH made of metal or the like and connecting the outside of the case and the optical waveguide device with an optical fiber F. Of course, it is possible not only to optically connect an input part or an output part of the optical waveguide of the substrate 1 and the optical fiber with a space optical system, but also to directly connect the optical fiber to the substrate 1. Symbol L1 indicates input light, and symbol L2 indicates output light.

By connecting an electronic circuit (a digital signal processor DSP), which outputs a modulation signal So that causes the optical modulation device MD to perform a modulation operation, to the optical modulation device MD, the optical transmission apparatus OTA can be configured. A driver circuit DRV is used because the modulation signal S, which is applied to the optical control element, needs to amplify the output signal So of the DSP. The driver circuit DRV or the digital signal processor DSP can be disposed outside the case SH, but can also be disposed inside the case SH. Particularly, by disposing the driver circuit DRV inside the case, it is possible to further reduce the propagation loss of the modulation signal from the driver circuit.

Industrial Applicability

As explained above, according to the present invention, it is possible to provide an optical waveguide device, and an optical modulation device and an optical transmission apparatus using the same, in which both signal electrode collapse and signal electrode peeling/damage can be prevented.

REFERENCE SIGNS LIST 1 ferroelectric (substrate that constitutes an optical waveguide device)

MD optical modulation device
OTA optical transmission apparatus

The invention claimed is:

1. An optical waveguide device in which a rib type optical waveguide is formed on a ferroelectric substrate having a thickness of 4 μm or less and having an electro-optic effect and a control electrode for controlling a light wave propagating through the optical waveguide is disposed on the substrate, wherein
   the control electrode includes a signal electrode with a height of 10 μm or more, and the signal electrode has a narrow portion, where a width of the signal electrode on a substrate side is narrow, and a wide portion, where a width of the signal electrode on an upper portion side of the signal electrode is wide,
   the signal electrode is disposed on an upper side of the rib type optical waveguide,
   a width of the signal electrode on the substrate side is narrower than a width of the rib type optical waveguide and is less than 1 μm,
   a prevention film that is disposed in contact with the narrow portion of the signal electrode and on an upper side of the rib type optical waveguide and that prevents the signal electrode from collapsing, is provided on the substrate, and
   at a position of the signal electrode where the narrow portion and the wide portion are connected, a surface of the prevention film is formed as a curved surface protruding toward the signal electrode, and a side surface of the signal electrode is formed along the curved surface.

2. The optical waveguide device according to claim 1, wherein
   the prevention film comprises a permanent resist.

3. The optical waveguide device according to claim 1, wherein
   a buffer layer is disposed on an upper side of the substrate including the rib type optical waveguide, and the signal electrode and the prevention film are disposed on an upper side of the buffer layer.

4. An optical modulation device comprising:
   the optical waveguide device according to any one of claims 1 to 3;
   a case that accommodates the optical waveguide device; and
   an optical fiber that inputs a light wave from an outside of the case to the rib type optical waveguide or that outputs the light wave from the optical waveguide to the outside of the case.

5. The optical modulation device according to claim 4, wherein
   an electronic circuit that amplifies a modulation signal, which is input to the optical waveguide device, is provided inside the case.

6. An optical transmission apparatus comprising:
   the optical modulation device according to claim 4; and
   an electronic circuit that outputs a modulation signal that causes the optical modulation device to perform a modulation operation.

* * * * *